(12) United States Patent
Chang

(10) Patent No.: US 12,386,206 B2
(45) Date of Patent: Aug. 12, 2025

(54) ERGONOMIC LOUPES WITH BEAM-REDIRECTING PRISMS

(71) Applicant: General Scientific/Surgitel, Ann Arbor, MI (US)

(72) Inventor: Byung J. Chang, Ann Arbro, MI (US)

(73) Assignee: General Scientific Corporation/Surgitel, Ann Arbor, MI (US)

( * ) Notice: Subject to any disclaimer, the term of this patent is extended or adjusted under 35 U.S.C. 154(b) by 406 days.

(21) Appl. No.: 17/959,589

(22) Filed: Oct. 4, 2022

(65) Prior Publication Data

US 2023/0107254 A1  Apr. 6, 2023

Related U.S. Application Data

(60) Provisional application No. 63/251,811, filed on Oct. 4, 2021.

(51) Int. Cl.
*G02C 7/08* (2006.01)
*G02B 23/10* (2006.01)
*G02C 7/14* (2006.01)

(52) U.S. Cl.
CPC .............. *G02C 7/088* (2013.01); *G02B 23/10* (2013.01); *G02C 7/14* (2013.01)

(58) Field of Classification Search
CPC .......... G02C 7/088; G02C 7/14; G02B 23/10; G02B 25/007; G02B 25/001
USPC ........................................................ 359/415
See application file for complete search history.

(56) References Cited

U.S. PATENT DOCUMENTS

| | | | |
|---|---|---|---|
| 6,120,145 A * | 9/2000 | Lyst, Jr. .............. | G02B 25/007 351/158 |
| 2007/0171520 A1 * | 7/2007 | Fante .................... | G02B 7/002 359/431 |
| 2017/0345274 A1 * | 11/2017 | Chang .................. | A61B 5/7405 |
| 2018/0136489 A1 * | 5/2018 | Hellström ............ | G02C 7/088 |
| 2022/0236555 A1 * | 7/2022 | Ton ....................... | G02B 25/007 |

FOREIGN PATENT DOCUMENTS

KR    2020141966 A  * 12/2020  ........... A61B 90/361

* cited by examiner

*Primary Examiner* — Stephone B Allen
*Assistant Examiner* — Boutsikaris Leonidas
(74) *Attorney, Agent, or Firm* — Fishman Stewart PLLC

(57) ABSTRACT

Ergonomic prism loupes provide establish deflection angle less than 45 degrees, more preferably around 40 degrees, to improves visual and postural ergonomics. It has been determined that with such a deflection angle, maximum head tilt is less than 20° for the vast majority of procedural configurations. The prism may be a roof prism. The eyepiece portion may include a singlet and a doublet lenses, and the objective portion may include a triplet lens. The objective portion may also include an optical element that establishes a working distance, and different eyepiece or objective portions may be provided for a range of magnifications. The invention further includes a structure for mounting the loupes on eyeglass frames, such as a through-the-lens (TTL) mounting structure, a front-lens mounting (FLM) structure, or a flip-up mounting structure.

20 Claims, 3 Drawing Sheets

ERGONOMIC LOUPES WITH BEAM-REDIRECTING PRISMS

REFERENCE TO RELATED APPLICATIONS

This application claims priority to, and the benefit of, U.S. Provisional Patent Application Ser. No. 63/251,811, filed Oct. 4, 2021, the entire content of which is incorporated herein by reference.

FIELD OF THE INVENTION

This invention relates generally to loupes of the type used by medical and dental professionals and, in particular, to ergonomic loupes with beam-redirecting or beam-deflecting prisms.

BACKGROUND OF THE INVENTION

As surgical, medical and dental procedures have become more precise, magnifying loupes have become more essential for many practitioners. There are several different types of loupes for these applications, including frame-mounted and headband-mounted styles, using through-the-lens (TTL) and front-lens-mounted (FLM) configurations Regardless, the "declination angle" may be defined as the angle between a reference line connecting the top of the ears (where the frame arm rests) to the corner of the eyes, and the optical axis of the loupes. In many cases, the frame temple arm may be used as the reference line if the temple arms are mounted at the same level with eyes.

All loupes provide users with magnification, and manufacturers have emphasized "clear vision" at the expense of declination angle-ergonomics. Clear vision makes sense, since if clinicians cannot see the subject very well, they cannot do their best work. However, if the declination angle is too small, the user is forced to bend their necks for prolonged periods of time, leading to short-term fatigue and worse, long-term neck problems such as chronic pain and injuries.

"Ergonomic" loupes are more than an expression bandied about in advertising True ergonomic loupes must satisfy two basic postural requirements: safe lower back posture and safe neck posture (or safe bead tilt). "Safe" head tilt in this context should be minimal-certainly less than 20 degrees from horizontal in an upright position. Whereas many loupes with proper working distance can help users achieve a safe lower back posture, most loupes force users to excessively tilt their heads, and this has become the leading cause of chronic neck pain among clinicians who use magnifying loupes.

It is relatively easy to increase declination angle with "flip-up" loupes because the oculars do not need the eyeglass lenses for support. As such, the optical axis of the loupes can be positioned at an extreme downward angle and the user's neck can be less tilted with a straight back. However, the positioning of TTL/FLM oculars is limited by the bottom edge of the lenses supported by the eyeglass frames. This leads to a restricted declination angle, limited by the size (and angle) of the carrier lenses. This causes the user to bend their head downwardly from the horizontal at a pronounced head angle, which may result in neck strain.

There have been many techniques used to increase declination angle with TTL/FLM loupes. Initially, the angle of the carrier lens(es) was increased relative to the frame temple arm, but this causes at least the lower portion of the lens(es) to be very close to the user's face, leading to potential discomfort. In accordance with commonly assigned U.S. Pat. No. 9,465,235, entitled "Through-the-lens (TTL) loupes with improved declination angle," holes are formed in the carrier lens(es), such that a portion of each ocular body extends below the bottom edge of the carrier lens to achieve an increased declination angle While the solution set forth in the '235 Patent increases declination angle in a unique way, care must be taken during hole formation and loupe mounting. In addition, the maximum angle may be limited by the type of carrier lens or lenses involved. While prisms have been used for the beam-deflection of oculars (loupe optics) to achieve a larger declination angle, the angle provided by the use of prisms has so far not achieved an optimal angle, which is believed to be less than 45 degrees, more preferably about 40 degrees.

SUMMARY OF THE INVENTION

This invention resides in ergonomic deflection loupes comprising an eyepiece portion defining a first optical axis, an objective portion defining a second optical axis, and a prism disposed in the optical path between the eyepiece and objective portions such that the first and second optical axes are at an angle less than 45 degrees. In the preferred embodiment, the first and second optical axes are at an angle of substantially 40 degrees. The invention further includes a structure for mounting the loupes on eyeglass frames, such as a through-the-lens (TTL) mounting structure, a front-lens mounting (FLM) structure, or a flip-up mounting structure.

The prism may be a roof prism. The eyepiece portion may include a singlet and a doublet lenses, and the objective portion may include a triplet lens. The objective portion may also include an optical element that establishes a working distance, and different eyepiece or objective portions may be provided for a range of magnifications.

The choice of an optical deflection or bending angle of less than 45 degrees was arrived at through substantial experimentation. In particular, a deflection angle less than 45 degrees, and most preferably around 40 degrees, improves visual and postural ergonomics. It has been shown that the maximum sustainable head tilt of a wearer of the loupes should be less than 20° to avoid, head, neck and back strain. Toward that end, it has been discovered that with a deflection angle less than 45 degrees—more preferably at substantially 40 degrees—maximum head tilt is less than 20° for the vast majority of procedural configurations.

DETAILED DESCRIPTION OF THE PREFERRED EMBODIMENTS

This invention resides in prism-based deflection loupes, wherein the deflection angle is less than 45 degrees, and most preferably around 40 degrees, to improve visual and postural ergonomics.

Figure 1:
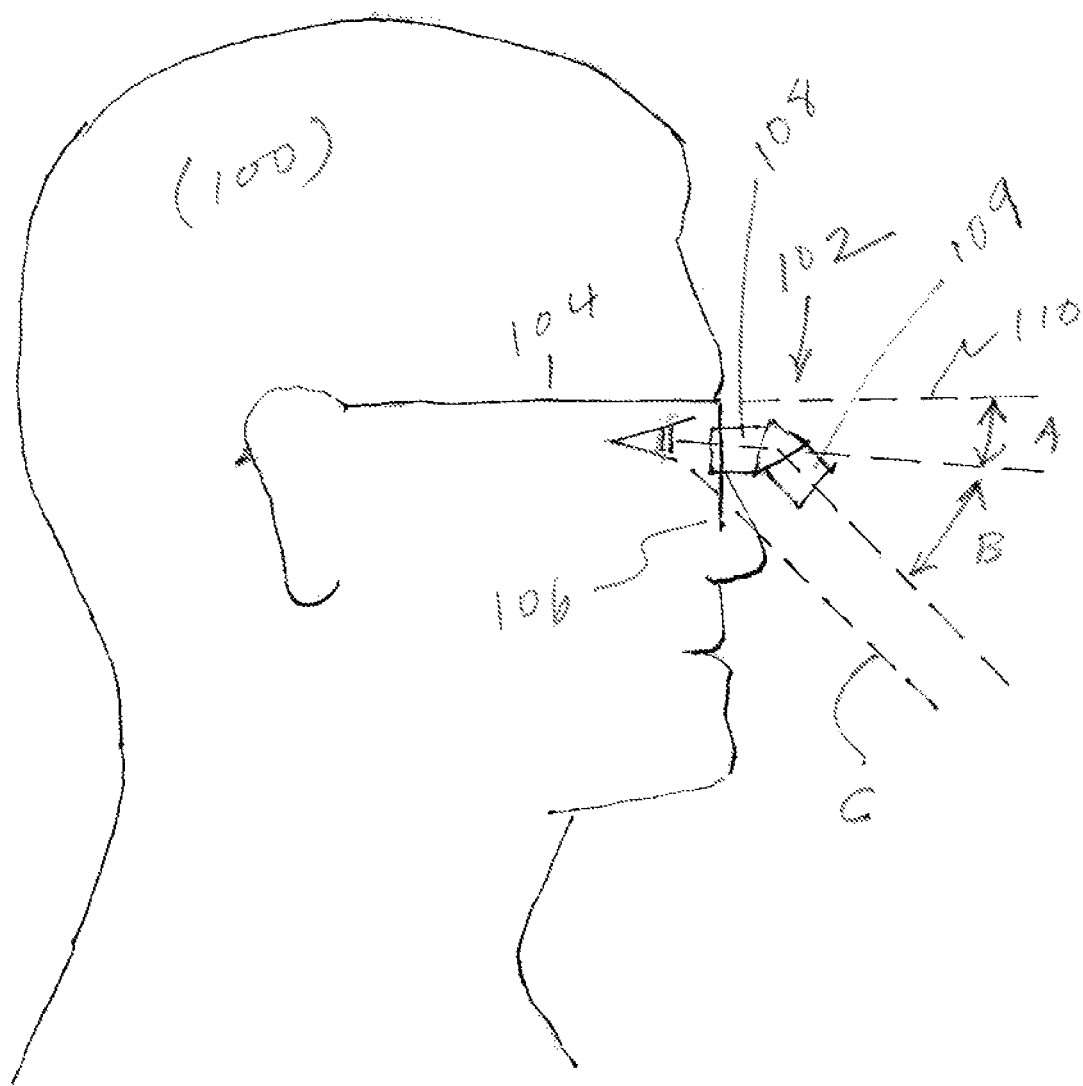
FIG. 1 is a side view of a simplified TTL/FLM embodiment of the invention.

Making reference to the accompanying drawings, FIG. 1 is a side view of a simplified TTL/FLM embodiment of the invention. A loupe is shown at 102 with the understanding there would be a pair, one for each respective eye of the wearer. The loupes in this case are mounted in or on one or more carrier lenses 106 coupled to eyeglass frame 104. Any style of frame may be used, including wrap-around styles, wherein a single curved piece of optical material such as plastic is used to form both the right and left carrier lenses.

A substantially horizontal line 110 has been drawn relative to the temple arm(s) of the eyeglass frames. Although the carrier lens 106 is shown as flat and perpendicular to the temple arm, this is a simplified drawing and the angle may be an acute angle. The inventive prism-deflection loupes 102 may be mounted such that the optical axis of the eyepiece portion is horizontal during use or, more likely, the loupes 102 would be mounted at a slight downward angle "A", typically less than 15 degrees.

The construction of the loupes 102 forms an angle between the optical axis of the eyepiece portion 108 and the objective portion 109. In the preferred embodiment, this angle "B" is substantially 40 degrees. The word "substantially" is used because some variance may be acceptable due to manufacturing tolerances, for example, such that an angle in the range of 38 to 42 degrees would be acceptable in accordance with the invention. Note that in all embodiments, to achieve a viewing angle of 40 degrees, more or less, the user need not bend their neck.

It has been shown that the maximum sustainable head tilt should be less than 20°, and that loupes profoundly influence the musculoskeletal health of clinicians. A majority of loupes on the market are not ergonomic, and place the user in an unsafe forward head-tilt posture (greater than) 20°. Clinicians with chronic neck, shoulder and upper back pain have used non-ergonomic loupes with small declination angles. By switching to properly designed and adjusted ergonomic loupes, however, they were able to eliminate their chronic neck, shoulder, and upper back pain. It has been discovered through extensive experimentation, that with the angle "B" (FIG. 1) less than 45 degrees, more preferably at substantially 40 degrees, maximum head tilt is less than 20° for the vast majority of procedural configurations.

The loupes 102 may be mounted at any convenient, operative location in front of the right and left eyes, depending upon the design and construction of the carrier lens(es). Note that if sufficiently spaced upwardly from the bottom edge of the carrier lens(es), a user may be able to look downwardly along line "C" for non-magnified viewing, again without excessive bending of the neck or back.

Figure 2:
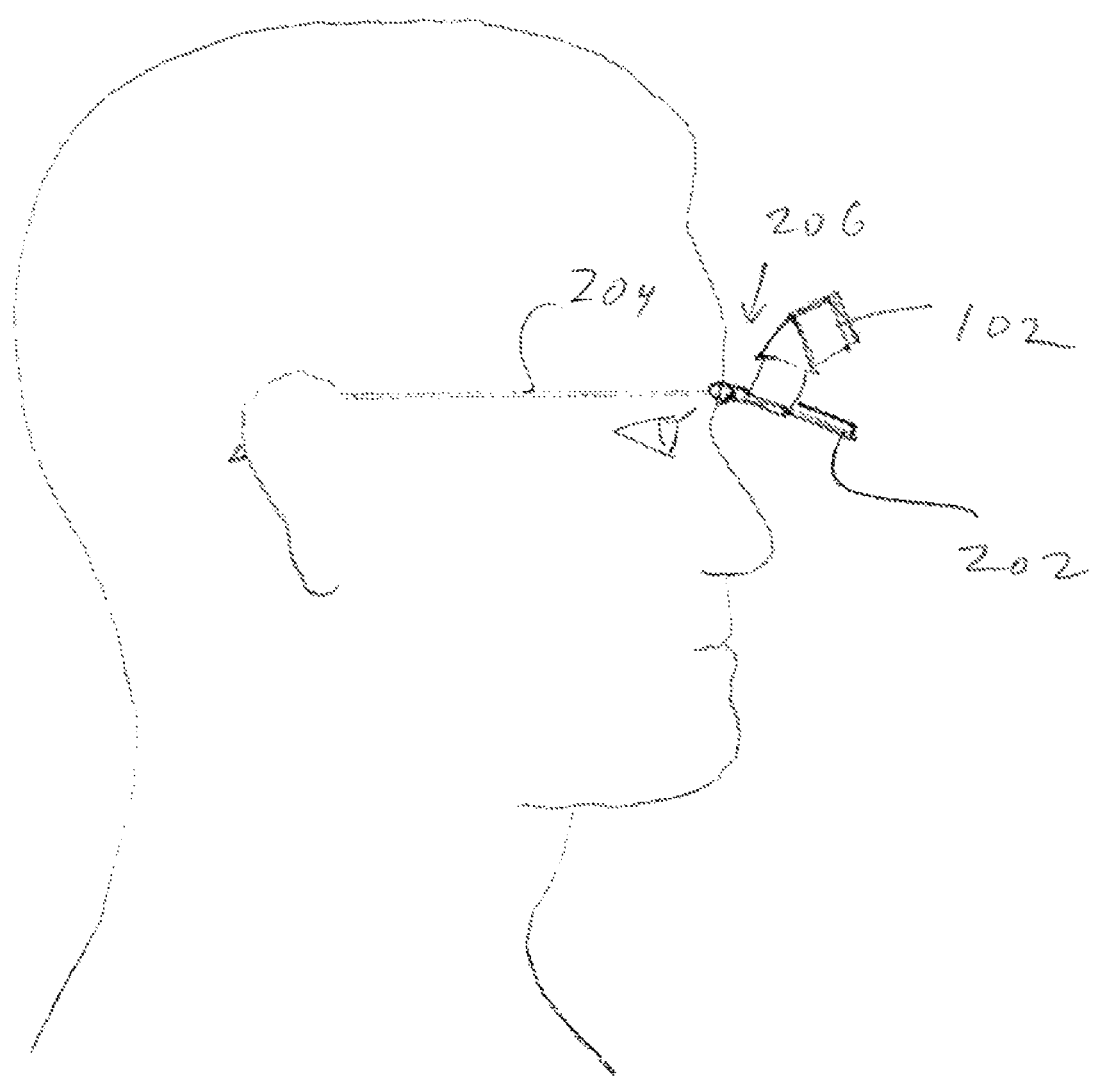
FIG. 2 is a drawing that shows a simplified flip-up implementation.

The invention is not limited to through-the-lens (TTL) or front-lens-mounted (FLM) mounting configurations. As shown in FIG. 2, flip-up configurations may also be accommodated. Although this drawing shows flip-up lenses 202 coupled to eyeglass frames 204 through hinge 206, other flip-up styles are possible as well, including eyeglass bridge-mounted loupes 102 that flip up independently from the lenses and flip-up loupes coupled to headbands.

Figure 3:
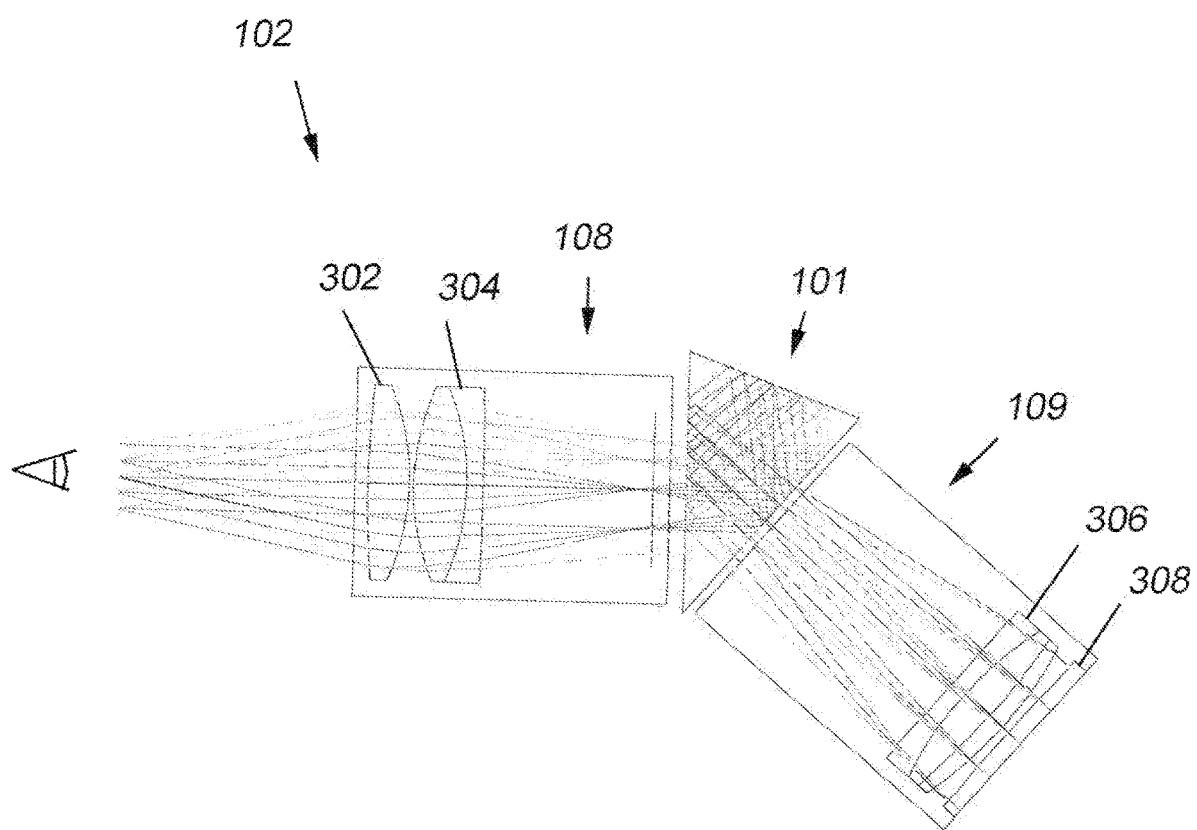
FIG. 3 is a ray-tracing of a preferred embodiment.

FIG. 3 is a ray tracing diagram of a preferred embodiment without any housing or mounting hardware. The eyepiece portion 108 is coupled to the prism 101, which is turn in is optical communication with the objective portion 109. While not limited to this particular arrangement of components, the eyepiece portion 108 may include a singlet 302 and doublet 304. The objective portion may include a triplet 306 followed by an element 308 operative to adjust working distance, with magnifications in the range of 3.5 to 10× or greater. The magnification of the components shown is about 3.5×.

In the design of FIG. 3, a single roof prism 101 provides an optical bend of substantially 40 degrees without image inversion. Heavy crown LAK-8 glass is preferably used in this design. The overall dimensions may be as follows, without limitation: length=44 mm; height-27 mm; and width=12 mm. Again, these dimensions would increase slightly when installed in a suitable housing.

The invention claimed is:

1. Ergonomic deflection loupes, comprising:
  an eyepiece portion defining a first optical axis;
  an objective portion defining a second optical axis;
  a single prism disposed in an optical path between the eyepiece portion and the objective portion, wherein the first optical axis and the second optical axis form an angle less than 45 degrees and the prism provides an optical bend without image inversion; and
  a structure for mounting the loupes on eyeglass frames.

2. The ergonomic deflection loupes of claim 1, wherein the first optical axis and the second optical axis form an angle of substantially 40 degrees.

3. The ergonomic deflection loupes of claim 1, wherein the structure for mounting the loupes on eyeglass frames comprises a through-the-lens (TTL) mounting structure.

4. The ergonomic deflection loupes of claim 1, wherein the structure for mounting the loupes on eyeglass frames comprises a front-lens mounting (FLM) structure.

5. The ergonomic deflection loupes of claim 1, wherein the structure for mounting the loupes on eyeglass frames comprises a flip-up mounting structure.

6. The ergonomic deflection loupes of claim 1, wherein the single prism is a roof prism.

7. The ergonomic deflection loupes of claim 1, wherein the eyepiece portion includes a singlet lens and a doublet lens.

8. The ergonomic deflection loupes of claim 1, wherein the objective portion includes a triplet lens.

9. The ergonomic deflection loupes of claim 1, wherein the objective portion includes an optical element that establishes a working distance.

10. The ergonomic deflection loupes of claim 1, wherein the first optical axis and second optical axis form an angle between 38 and 42 degrees.

11. The ergonomic deflection loupes of claim 1, wherein the single prism has a length of approximately 44 mm, a height of approximately 27 mm, and a width of approximately 12 mm.

12. The ergonomic deflection loupes of claim 1, wherein the single prism includes heavy crown LAK-8 glass.

13. The ergonomic deflection loupes of claim 1, wherein the objective portion includes an optical element configured to provide magnification.

14. The ergonomic deflection loupes of claim 1, wherein the objective portion includes an optical element that provides a magnification between about 3.5× to 10×.

15. The ergonomic deflection loupes of claim 1, wherein the objective portion includes an optical element that provides a magnification of at least 10×.

16. The ergonomic deflection loupes of claim 7, wherein the singlet lens is a plano-convex lens.

17. The ergonomic deflection loupes of claim 7, wherein the doublet lens includes a biconvex lens and a plano concave lens.

18. The ergonomic deflection loupes of claim 8, wherein the triplet lens includes a plano-concave lens, a biconvex lens, and a meniscus lens.

19. The ergonomic deflection loupes of claim 18, wherein the biconvex lens between the plano-concave lens and the meniscus lens.

20. The ergonomic deflection loupes of claim 19, wherein the meniscus lens is adjacent to an optical element.

* * * * *